Aug. 12, 1969     W. J. KUDLATY     3,460,805
VALVE HEAD FOR BY-PASS VALVE
Filed Oct. 18, 1966
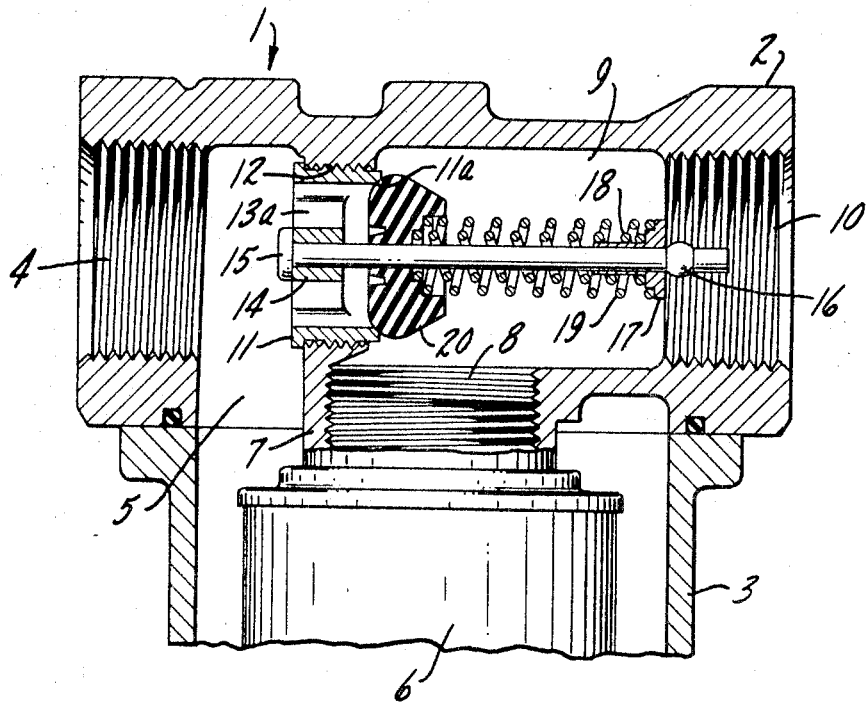
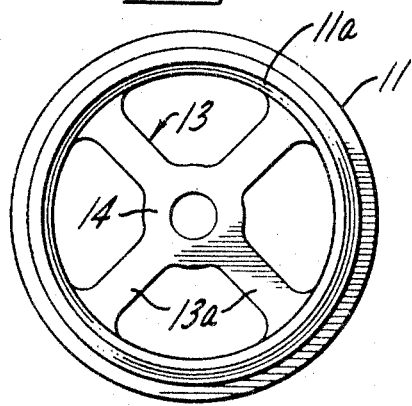
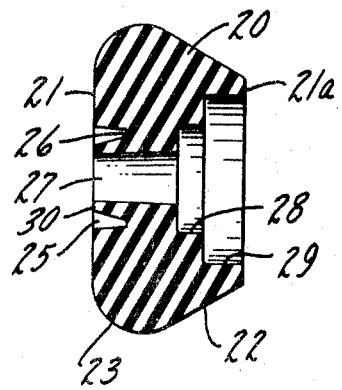
INVENTOR.
Walter J. Kudlaty,
BY Parker & Carter
Attorneys.

United States Patent Office 3,460,805
Patented Aug. 12, 1969

3,460,805
VALVE HEAD FOR BY-PASS VALVE
Walter J. Kudlaty, Elmhurst, Ill., assignor to Marvel Engineering Company, Chicago, Ill., a corporation of Illinois
Filed Oct. 18, 1966, Ser. No. 587,452
Int. Cl. F16k 17/04, 15/14
U.S. Cl. 251—357                           2 Claims

ABSTRACT OF THE DISCLOSURE

A valve head made of rubber-like material with an axial bore therethrough so as to be slidably received on a valve stem. An annular groove is formed in the forward end face of the head and surrounds the bore, with the inner wall of the groove being inclined outwardly toward the bore whereby fluid filling the groove under pressure will urge the wall toward the bore to seal the stem.

---

This invention relates to by-pass valves and has particular relation to a by-pass valve usable with filters and the like.

One purpose of the invention is to provide a by-pass valve effective to insure a positive valve orifice seal.

Another purpose is to provide a by-pass valve effective to insure a positive valve stem seal.

Another purpose is to provide a by-pass valve effective to insure a streamline flow therearound.

Another purpose is to provide a by-pass valve effective to insure against blockage of a housing outlet with which said valve is associated.

Another purpose is to provide a by-pass valve assembly including nested springs capable of multiple settings.

Another purpose is to provide a by-pass valve interchangeable with pre-existing valves in existing structures.

Other purposes may appear from time to time during the course of the specification and claims.

The invention is illustrated more or less diagrammatically in the accompanying drawings wherein:

FIGURE 1 is a side view in partial cross section;
FIGURE 2 is a detail view of the valve base or supporting ring in FIGURE 1; and
FIGURE 3 is a detail view in cross section.

Like parts are indicated by like numerals throughout the specification and drawings.

Referring now to the drawings, the numeral 1 generally designates a housing, such as a filter housing. The filter housing 1 includes a head 2 and a body 3 shown in part herein. The head 2 has formed therein an inlet port 4. The port 4 communicates through passage 5 with the area within housing part 3. A filter element 6 is present in housing part 3 and engages a boss 7 through which outlet passage 8 extends. Outlet passage 8 communicates with a chamber 9 which in turn communicates with outlet port 10. A valve base or support ring 11 is secured in an aperture 12 positioned to communicate inlet 4 directly with chamber 9 and outlet 10. The base 11 includes a web 13 formed of radially extending circumferentially spaced arms 13a and including a central sleeve 14. A valve support rod 15 is secured in sleeve 14 and extends axially therefrom into chamber 9. The opposite end of stem 15 carries an abutment or enlargement 16 against which a spring seat member 17 is urged by clustered, coaxial springs 18, 19.

The opposite ends of springs 18, 19 engage a valve head member 20 formed of a material having properties of rubber, Viton A or Buna N being suitable. It will be observed that the head member 20 includes a forward, relatively flat end surface 21, a rear, relatively flat end surface 21a, the surfaces 21, 21a being joined by a circumferential surface comprised of a rearward frusto-conical portion 22 and a curved surface 23. It will be observed that the maximum diameter of the curved surface 23 is greater than the inner diameter of ring support 11 and that the edge 11a of ring 11 exposed to chamber 9 forms a seat for valve head member 20. It will also be observed that the surface 21 meets curved surface 23 at a point within the inner diameter of ring 11.

Forward surface 21 of valve head member 20 has a circular groove 25 formed therein. As may be best seen in FIGURE 3, the groove 25 has a base or bottom wall 26 paralleling surface 21. The outer wall of groove 25 is shown as inclined outwardly from base wall 26 at an angle of the order of 5 degrees from normal to base wall 26 and surface 21. The inner wall of groove 25 is shown as inclined outwardly at an angle of the order of 15 degrees from normal to base wall 26 and surface 21.

The valve head 20 has an axial bore 27 formed therethrough. The portion of the bore 27 extending through the forward area of valve 20 occupied by groove 25 forms with the material of the valve head 20 between groove 25 and bore 27 a sealing lip 30 for the valve stem 15. The bore 27 is, in its free, unoccupied state, slightly conical, diminishing toward the surface 21 of valve head 20. Thus, for example, the diameter of the bore 27 at its juncture with surface 21 of valve head 20 may be of the order of .180 inch. From this point the bore 27 increases slightly, to say .188 or .198 inch in diameter at a point intermediate the forward surface 21 and rear surface 21a of valve head 20. At this intermediate point the bore 27 is offset or enlarged to form an annular spring seat indicated at 28. Beyond the seat 28 the bore 27 is again enlarged or offset to form a second and larger spring seat 29.

The use and operation of the invention are as follows:

The valve structure illustrated herein may be inserted through port 4 in the form of a cartridge, the base support 11 being threaded or otherwise seated in aperture 12. The entire structure of the valve assembly illustrated herein is carried by the support 11.

In normal operation fluid flows through inlet port 4 and passage 5 to filter element 6. The fluid then flows through filter element 6 and the filtered fluid flows through passage 8, chamber 9 and outlet port 10. Under such circumstances a clear flow area is presented to the fluid flowing through passage 8 and chamber 9.

Should the filter element 6 become sufficiently clogged, pressure will increase in housing part 3, passage 5 and inlet 4. When said pressure rises above the predetermined forces of springs 18 and 19, valve head member 20 will be moved off its seat formed by the adjacent edge 11a of support ring 11. Thereafter fluid will flow from inlet 4 through support 11, about head 20, through chamber 9 and outwardly through outlet 10.

It will be observed that the lip 30 formed within groove 25 serves as an effective seal upon stem 15 at all positions of valve head 20. Similarly, the material of valve head 20 forms a tight seal against the valve seat 11a surrounding the valve orifice through support 11. Thus, with the valve in the closed position illustrated in FIGURE 1 assurance is provided against the flow of fluid entering inlet 4 directly into chamber 9 through ring base support 11 and all such fluid is forced to flow through passage 5 for filtering by element 6. Pressure of such fluid filling groove 25 is effective against the inner wall surface of groove 25 to further increase the sealing effect of the lip 30.

With the design of the valve illustrated herein a constant and continuous flow area is provided through passage 8, chamber 9 and outlet 10, regardless of the position of valve head 20 and regardless of the open or closed configuration of springs 18 and 19.

Springs 18 and 19 are, of course, coaxial and are clustered one within the other. The spring seat member 17 has an elongated sleeve portion extending along the stem 15 from abutment 16 to insure parallelism of the springs 18 and 19 with the stem 15. Similarly, a substantial axial portion of the head 20 engages stem 15.

The shape of head 20, in the nature of a teardrop design, insures a streamline flow of fluid about the head 20 when the same is off the seat formed by support 11. The curved surface 23 begins within the diameter of said seat and fluid is caused to flow around said curvature 23 as it enters chamber 9.

It will be understood that springs 18 and 19 may be of different forces, enabling a selection and employment of multiple settings for valve 20. Such selection will, of course, be influenced by the type and nature of the fluid to be filtered, the normal pressures under which such fluid enters inlet 4, the nature of the filtering material employed in element 6, and like considerations.

There is claimed:

1. A valve head formed entirely of a material having the properties of rubber, said valve head having a forward end face and a rearward end face and having an axial bore extending through said head and positioned to receive a stem in sliding engagement therewithin, an annular groove formed in said forward end face of said head and surrounding said bore, the inner wall of said groove being inclined outwardly toward said bore and said bore having a diameter increasing in a direction away from said forward end face of said head, whereby fluid filling said groove under pressure will urge said wall toward said bore to seal said stem.

2. The structure of claim 1 wherein said forward and rearward end faces of said valve head are flat and parallel one with the other and characterized by and including a circumferential surface extending between said faces, the maximum diameter of said circumferential surface being greater than the diameter of either of said faces, said circumferential surface including a rearwardly converging conical portion adjacent said rearward surface and a curved portion joining said forward face and said conical portion.

References Cited

UNITED STATES PATENTS

| | | | |
|---|---|---|---|
| 828,036 | 8/1906 | Lindsay | 137—543.15 |
| 1,405,968 | 2/1922 | Christman | 137—543.15 |
| 2,803,265 | 8/1957 | Coffey | 137—525 XR |
| 2,854,996 | 10/1958 | Hughes | 137—525 XR |
| 2,962,047 | 11/1960 | Obermaier | 137—525 |
| 3,027,134 | 3/1962 | Nichols | 251—175 |
| 3,028,139 | 4/1962 | Mastis | 251—175 |
| 3,032,060 | 5/1962 | Huffman | 137—525.5 XR |
| 3,104,883 | 9/1963 | English et al. | 277—205 |
| 3,171,659 | 3/1965 | Anderson et al. | 277—205 XR |
| 3,315,696 | 4/1967 | Hunter | 137—525 XR |

JOHN PETRAKES, Primary Examiner

U.S. Cl. X.R.

137—525, 543; 251—308, 323, 368